(12) United States Patent
Schueler et al.

(10) Patent No.: US 6,302,647 B1
(45) Date of Patent: Oct. 16, 2001

(54) TURBINE INLET SCROLL

(75) Inventors: Joshua D Schueler, New Lenox; John R. Zagone, Westmont, both of IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/567,880

(22) Filed: May 10, 2000

(51) Int. Cl.[7] ........................................... F01D 9/04
(52) U.S. Cl. .................. 415/184; 415/191; 415/189; 415/205; 415/209.2; 415/210.1; 415/204; 417/409
(58) Field of Search ................ 417/409; 60/605.1, 60/605.2; 415/184, 191, 195, 204, 205, 189, 190, 208.2, 209.2, 210.1

(56) References Cited

U.S. PATENT DOCUMENTS 2,932,156 * 4/1960 Eckert et al. ........................ 415/191
5,868,553 * 2/1999 Battig et al. ......................... 415/189

* cited by examiner

Primary Examiner—Christopher Verdier
(74) Attorney, Agent, or Firm—Cary W. Brooks

(57) ABSTRACT

An engine turbocharger includes a turbine inlet scroll for conducting exhaust gas from a laterally offset position to the annular inlet of a turbine wheel. An outer wall defines a generally S-shaped passage connecting an inlet flange with concentric annular outlet flanges aligned on laterally spaced parallel axes. An inner wall positioned near the outlet end of the turbine inlet duct defines an annular passage portion for distribution of exhaust gas to the turbine inlet. Three annularly spaced struts or vanes support the inner wall within the outer wall slightly upstream from the outlet flanges of the scroll. A straight vane is positioned on the central plane of the turbine inlet scroll to support the wall with the least possible interference with gas flow. Second and third vanes are positioned approximately 110 degrees clockwise and counterclockwise respectively from the first vane and are formed as aerodynamically curved vanes which assist in redirecting the gas flow in an axial direction toward the annular outlet of the scroll to provide relatively even distribution of gas to the turbine inlet.

8 Claims, 3 Drawing Sheets

TURBINE INLET SCROLL

TECHNICAL FIELD

This invention relates to engine exhaust driven turbochargers and more particularly to a turbine inlet scroll and duct for conducting pressurized exhaust gas from an engine exhaust system to an annular inlet of a turbine wheel.

BACKGROUND OF THE INVENTION

It is known in the art relating to engine turbochargers to provide an inlet duct which changes from an open conduit to an annular passage for delivering pressurized exhaust gas to the inlet of an exhaust turbine with relatively even pressure and flow distribution around the turbine annular inlet. In the case of an offset exhaust system connection, the inlet duct has been joined with an annular scroll that provides a plenum-like volume to evenly distribute the exhaust gas through angled vanes of an nozzle ring to the energy converting blades of a turbine wheel. Where a relatively short axial distance is allowed for connecting an exhaust manifold with a laterally offset turbine inlet to a free wheeling turbine, the even distribution of exhaust gas to an annular turbine inlet from a minimal plenum area requires specific design of the annular passage portion of the inlet scroll.

SUMMARY OF THE INVENTION

The present invention provides a relatively short coupled turbine inlet scroll and duct wherein an inlet portion connectable with an engine exhaust manifold is ducted through a generally S-shaped passage to a laterally offset position where the passage is merged into an annular outlet connectable with a turbine inlet nozzle ring. An outer wall of the scroll defines the generally S-shaped passage while an inner wall in the outlet end of the passage converts the open passage to an annular passage configuration.

Struts are provided between the outer wall and the inner wall to support the inner wall within the outlet portion of the inlet scroll. The shapes of the outer and inner walls are developed to effectively diffuse the exhaust gas leaving the engine exhaust manifold to a larger annular exit area in an efficient manner. However, the relatively compact form and tight curves of the short-coupled inlet scroll cause difficulties in turning the exhaust gas back to the axial flow direction and maintaining even distribution of the gas to the turbine inlet. These problems are reduced by forming the struts with aerodynamic shapes that reduce turbulence in the gas flow and by properly positioning and shaping some of the ducts as flow directing vanes. The vanes then assist the configurations of the walls in redirecting and evenly distributing the exhaust gas across the annular portion of the passage for distribution to the connected turbine inlet.

These and other features and advantages of the invention will be more fully understood from the following description of certain specific embodiments of the invention taken together with the accompanying drawings.

DESCRIPTION OF THE PREFERRED EMBODIMENT

Figure 1:
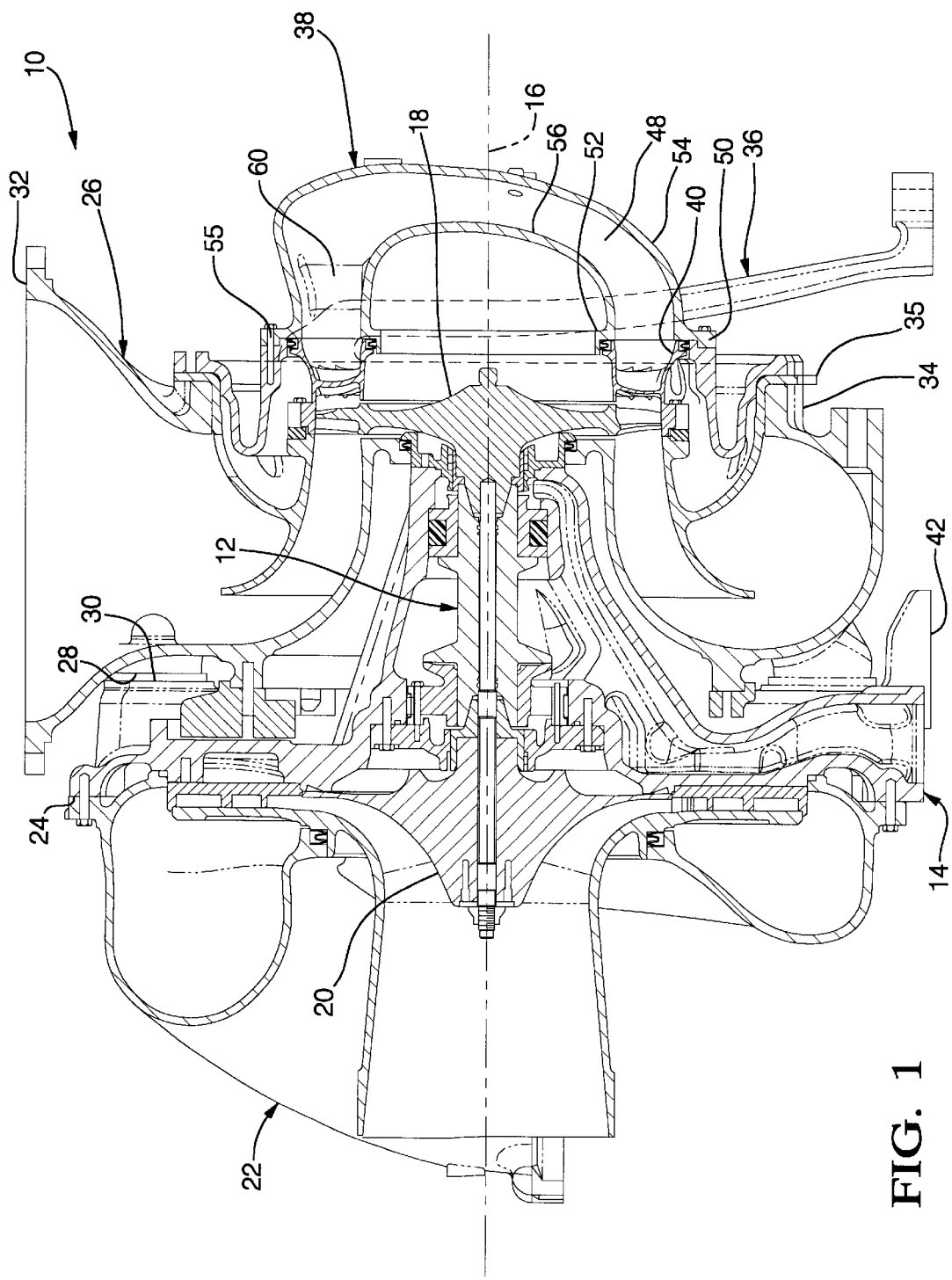
FIG. 1 is a cross-sectional view of an engine turbocharger having a turbine inlet-scroll in accordance with the invention.
Figure 2:
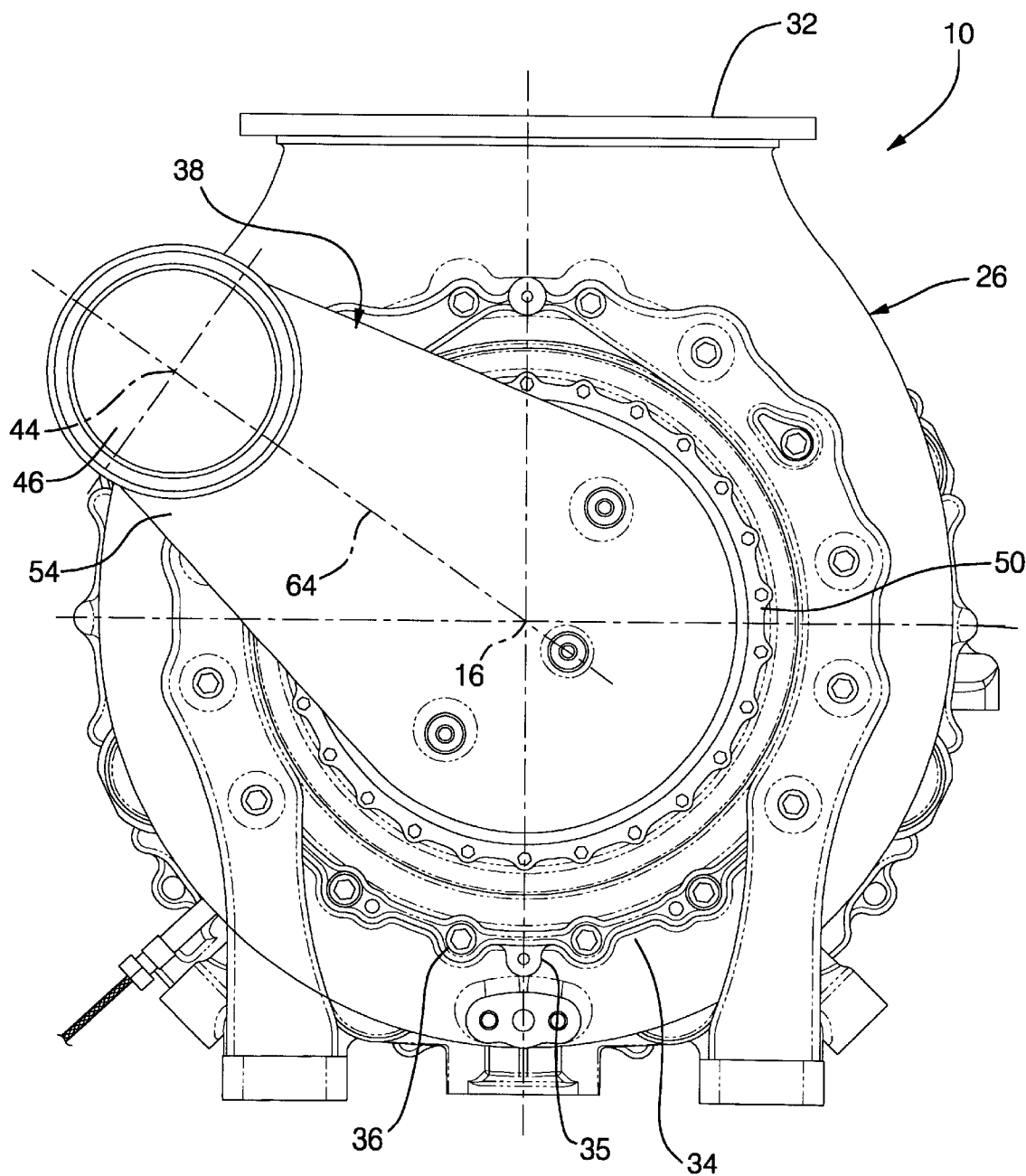
FIG. 2 is an exhaust end view of the turbocharger showing the orientation of the scroll to the turbine section of the turbocharger in one embodiment of the invention.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20.

In the illustrated exemplary embodiment of the invention, the turbine inlet scroll 38 (FIGS. 3–5) conducts exhaust gas from an inlet flange 42 centered on an offset axis 44 spaced laterally to one side of and above the longitudinal axis 16 of the turbocharger rotor. The exhaust gas is conducted through a relatively short coupled generally S-shaped passage 46 to a scroll-like outer end forming an annular passage portion 48 that ends at concentric outer and inner connecting means defined by outer and inner flanges 50, 52. Fastener openings 55 are provided in flange 50 for attaching the scroll to the exhaust duct support 36 of the associated turbocharger 10. The outer flange 50 is connected with the inlet flange 42 by an outer wall 54 which defines the generally S-shaped configuration of the passage 46. The inner flange 52 connects with an inner wall 56 which extends only partially into the passage 46 and is configured to smoothly change the passage from an open duct into the annular passage portion 48 which extends to the flanges 50, 52.

In order to support the inner wall 56 and inner flange 52 within the outer wall 54, three struts or vanes 58, 60, 62 are provided spaced slightly upstream from the flanges 50, 52 and extending radially between the inner wall 56 and the outer wall 54. While a minimum number of three vanes is preferred in order to adequately support the inner wall 56, additional vanes could be utilized if needed or desired.

Figures 3, 4, 5:
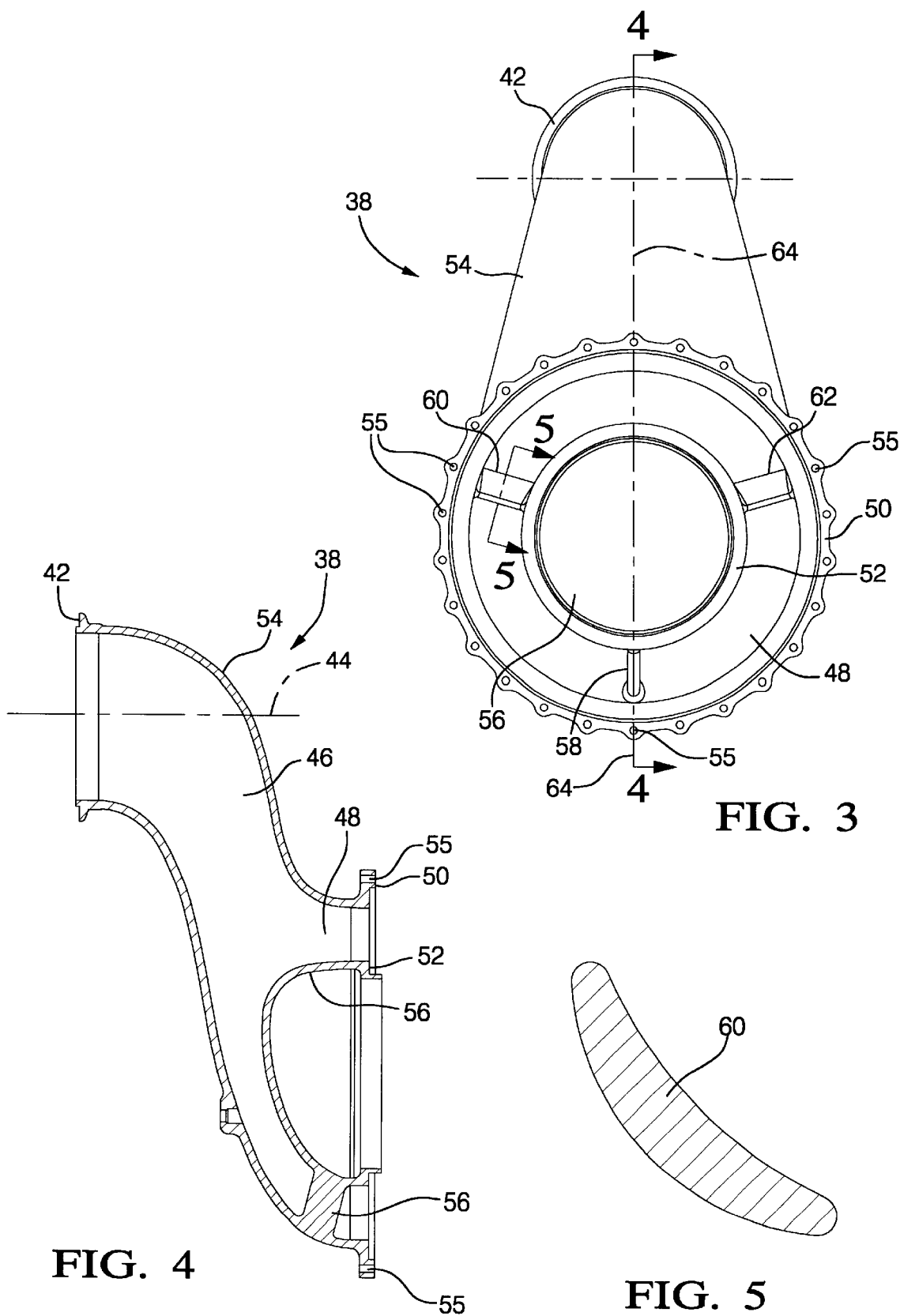
FIG. 3 is a turbine end view of a turbine inlet scroll according to the invention.
FIG. 4 is a cross-sectional view from the line 4—4 of FIG. 3.
FIG. 5 is a cross-sectional view of a curved vane from the line 5—5 of FIG. 3.

A first one of the vanes 58 is optionally located in a central plane 64 evenly dividing the S-shaped passage 46. The vane is thus aligned with the flow and is formed as an aerodynamic straight vane which minimizes turbulence in the gas passing the vane while avoiding deflection of the gas from its direct path. Vanes 60 and 62 are positioned at locations offset from the central plane 64 in portions of the annular passage where substantial turning of the exhaust gas into the annular outlet is required. To assist this turning in areas where the inner and outer walls are less effective than at their upper and lower portions, the vanes 60, 62 are positioned at 110 degree angles clockwise and counter-clockwise (in FIG. 3) respectively from the centrally positioned vane 58. Vanes 60 and 62 are also curved as indicated in FIG. 5 to assist in redirecting the gas flow adjacent their locations toward the annular outlet of the turbine inlet scroll and thereby improve even distribution of gas to the annular outlet of the scroll and the connected turbine inlet.

The exact angular positioning of the vanes to obtain the desired even distribution characteristics and the number of vanes required may be varied as desired and as required by the particular configurations of the offset ducts needed for various engine turbocharger applications. Thus, the arrangement of the described embodiment, while presently considered optimal for the particular configuration illustrated, is subject to modification to meet the particular conditions of other modified arrangements.

While the invention has been described by reference to certain preferred embodiments, it should be understood that numerous changes could be made within the spirit and scope of the inventive concepts described. Accordingly, it is intended that the invention not be limited to the disclosed embodiments, but that it have the fill scope permitted by the language of the following claims.

What is claimed is:

1. A turbine inlet scroll for connecting an engine exhaust manifold outlet with a turbocharger, said inlet scroll comprising:

an outer wall defining a passage leading from an inlet to an outlet;

outer connecting means at the outlet for connecting the outlet with such turbocharger;

an inner wall extending from inner connecting means at the outlet end of the passage into an adjacent portion of the passage and forming the adjacent portion into an annular passage portion internally defined by the inner wall, the inner connecting means being spaced within the outer connecting means;

said annular outlet aligned on an outlet axis adapted to be coaxial in assembly with a rotor of such turbocharger, said inlet spaced laterally away from the outlet and said passage extending from the inlet toward the axis and formed into said annular passage portion adjacent the outlet, the annular passage portion curving from largely lateral flow adjacent an upstream end of the inner wall to essentially axial flow at said outlet; and a plurality of struts in the annular passage portion and connecting the inner and outer walls upstream from the annular outlet, at least some of the struts formed as curved vanes for directing gas flow in the passage toward the axial flow direction adjacent the passage outlet.

2. A turbine inlet scroll as in claim 1 wherein said struts are aerodynamically shaped vanes to minimize turbulence in gas flow through the passage.

3. A turbine inlet scroll as in claim 2 wherein said struts include a first strut formed as a straight vane disposed in alignment with gas flow to the outlet and additional struts spaced angularly away from the first strut and formed as flow directing curved vanes.

4. A turbine inlet scroll as in claim 3 wherein there are only three struts, the first strut located adjacent a distal end of the passage and the other struts comprising curved vanes spaced angularly on opposite sides of the outlet.

5. A turbine inlet scroll as in claim 4 wherein said other struts are spaced about 110 degrees in angularly opposite directions from the first strut.

6. A turbine inlet scroll as in claim 1 wherein said inlet includes inlet connecting means aligned on an inlet axis parallel with said outlet axis.

7. A turbine inlet scroll as in claim 6 wherein said outer wall defines a generally S-shaped passage.

8. A turbine scroll as in claim 1 wherein said outer connecting means includes a flange having fastener openings for attaching the scroll to such turbocharger.

* * * * *